L. A. MAPEL.
NECKBAND SHAPER.
APPLICATION FILED MAY 11, 1906. RENEWED NOV. 23, 1908.
910,140.
Patented Jan. 19, 1909.
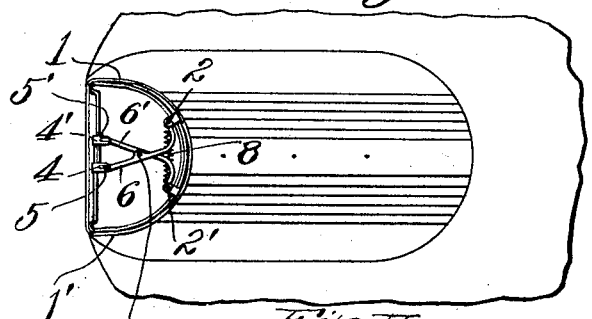
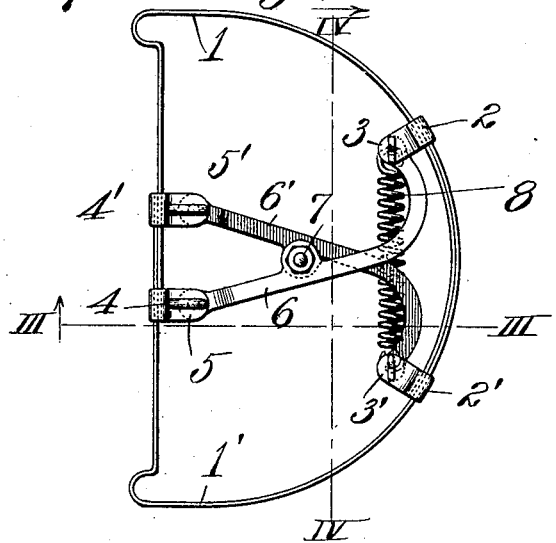
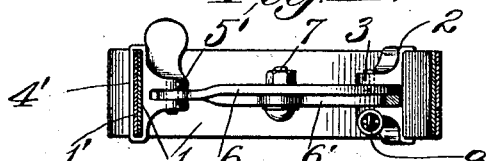
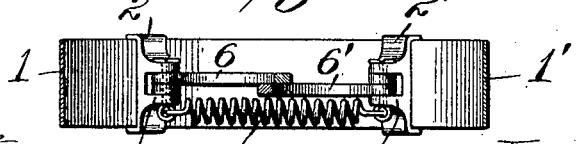

UNITED STATES PATENT OFFICE.

LEWIS A. MAPEL, OF ST. LOUIS, MISSOURI.

NECKBAND-SHAPER.

No. 910,140.  Specification of Letters Patent.  Patented Jan. 19, 1909.

Application filed May 11, 1906, Serial No. 316,255. Renewed November 23, 1908. Serial No. 464,053.

*To all whom it may concern:*

Be it known that I, LEWIS A. MAPEL, a citizen of the United States, residing in the city of St. Louis, in the State of Missouri, have invented certain new and useful Improvements in Neckband-Shapers, of which the following is a full, clear, and exact description, reference being had to the accompanying drawing, forming part of this specification.

My invention relates to that class of devices used for holding the neck-bands of shirts in shape or in a stretched condition while the bosoms of the shirts are being ironed, and it has for its object to produce a shaper of this character that may be readily and quickly adjusted to suit it for use in shaping neck-bands of various sizes, and one which automatically returns to an expanded condition when contracted and placed within a neck-band and when removed from the band within which it has been used.

Figure I is a top or plan view of my device in use within the neck-band of a shirt. Fig. II is an enlarged top or plan view of the shaper. Fig. III is a cross section taken on line III—III, Fig. II. Fig. IV is a longitudinal section taken on line IV—IV, Fig. II.

1 and 1' designates the band stretching members of my neck-band shaper, each of these members consisting of a pair of wings, one of which is curved and the other of which is straight and occupies an angle relative to the curved wing. The stretcher members are preferably of sheet metal and also preferably of a metal having the property of resiliency. The straight wings of the stretcher members overlap each other and the curved wings also overlap each other, thereby providing for the sliding of said wings relative to each other, in order that the combined members may be susceptible of being expanded collectively to increase the size of the shaper and contracted collectively to diminish the size of the shaper. The curved wing of the stretcher member 1 has fixed to it a keeper 2' that is provided with an ear 3' and which loosely incloses the adjacent and overlapping curved wing of the stretcher member 1', and the curved wing of the stretcher member 1' has fixed to it a keeper 2 which loosely incloses the overlapping curved wing of the stretcher member 1 and is provided with an ear 3. By thus fitting the curved wings of the stretcher members to each other and inclosing them by the keepers 2 and 2', I provide for the retention of the curved wings in assembled condition in such manner as to permit the sliding of each relative to the other. The straight wing of the stretcher member 1 has fixed to it a keeper 4 which loosely incloses the overlapping straight wing of the stretcher member 1' and is provided with a finger piece 5. The straight wing of the stretcher member 1' has fixed to it a keeper 4' that loosely incloses the overlapping straight wing of the stretcher member 1 and is provided with a finger piece 5'. The straight wings of the shaper are thereby held in assembled condition in a manner similar to that in which the curved wings are held, and in a manner to permit of the straight wings sliding relative to each other.

6 designates a link connecting the keeper 4 of the stretcher member 1 to the keeper 2 of the stretcher member 1', the link being pivotally attached to each of said keepers in order that it may swing freely therein.

6' is a link connecting the keeper 4' of the stretcher member 1' and the keeper 2' of the stretcher member 1, the form of connection of said link to said keepers being a pivotal one, thereby providing for free movement of the link relative to the keepers. The links 6 and 6' are pivoted to each other intermediate of their ends by a bolt 7 or other suitable means. 8 is a contractible spring, the ends of which are attached to the ears of the keepers 2 and 2' to which the links 6 and 6' are connected.

My shaper in its normal condition and when not in use is in expanded condition, in which condition it is maintained by the spring 8 which serves to draw the keepers 2 and 2' toward each other, thereby carrying the wings of the stretcher members outwardly. When the shaper is to be placed within the neck-band of a shirt, the user places the fingers of his two hands against the curved wings of the stretcher members and places his thumbs against the finger-pieces 5 and 5' of the keepers 4 and 4' at their facing sides and exerts an outward pressure against said keepers by the thumbs to cause sliding movement of the straight stretcher member wings. As the keepers 4 and 4' move outwardly or away from each other, movement is imparted to the arms of the links 6 and 6' connected to said keepers and as a consequence the keepers 2 and 2' are moved away from each other. The result is that the curved wings of the two stretcher members are carried inwardly relative to each other while confined by the keepers attached to and inclosing them, and therefore the entire shaper is contracted. The operator then releases the finger-pieces of the keepers 4 and 4′ and the spring 8 connecting the keepers 2 and 2′ serves to draw the last named keepers toward each other, whereby the stretcher is expanded until it assumes a size corresponding to the neck-band within which it has been fitted.

While I have shown and described the stretcher members of my shaper as consisting of curved wings and straight wings, it is obvious that the wings might be otherwise shaped without departing from the spirit of my invention.

I claim:

1. In a neck-band shaper, the combination of a pair of stretcher members each comprising a pair of wings diverging from each other and slidably fitted to the wings of the other member, keepers carried by said members, and spring controlled links connecting said keepers, substantially as set forth.

2. In a neck-band shaper, the combination of a pair of stretcher members each comprising a pair of wings diverging from each other and slidably fitted to the wings of the other member, keepers carried by said members, and links pivotally connected to each other and connecting said keepers, substantially as set forth.

3. In a neck-band shaper, the combination of a pair of stretcher members each comprising a pair of wings diverging from each other and slidably fitted to the wings of the other member, keepers carried by said members, and spring controlled links pivotally connected to each other and connecting said keepers, substantially as set forth.

4. In a neck-band shaper, the combination of a pair of stretcher members each comprising a pair of wings diverging from each other, keepers fixed to each of said wings and loosely embracing the wings of the other member, and links connecting the keepers carried by one member with the keepers carried by the other member, substantially as set forth.

5. In a neck-band shaper, the combination of a pair of stretcher members each comprising a pair of wings diverging from each other, keepers fixed to each of said wings and loosely embracing the wings of the other member, and spring controlled links connecting the keepers carried by one member with the keepers carried by the other member, substantially as set forth.

6. In a neck-band shaper, the combination of a pair of stretcher members each comprising a pair of wings diverging from each other, keepers fixed to each of said wings and loosely embracing the wings of the other member, links pivoted to and crossing each other and pivoted to said keepers, and a spring connecting two of said keepers, substantially as set forth.

7. In a neck-band shaper, the combination of a pair of stretcher members each comprising a pair of wings diverging from each other and slidably fitted to the wings of the other member, keepers carried by said members, and springs connecting said keepers; two of said keepers being provided with finger-pieces, substantially as set forth.

LEWIS A. MAPEL.

In presence of—
NELLIE V. ALEXANDER,
BLANCHE HOGAN.